March 7, 1933.  G. CARLSON  1,900,542
WIRING DEVICE
Filed May 28, 1931
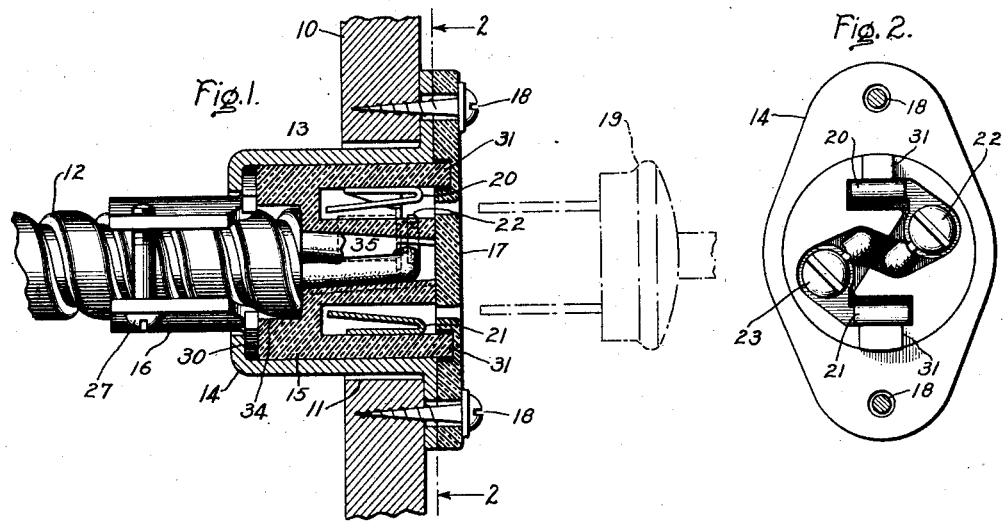
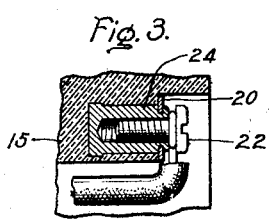
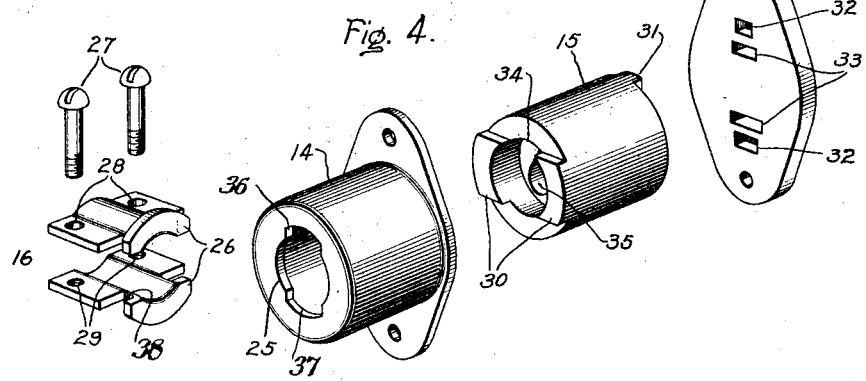
Inventor:
George Carlson,
by Charles E. Mullen
His Attorney.

Patented Mar. 7, 1933

1,900,542

UNITED STATES PATENT OFFICE

GEORGE CARLSON, OF BRIDGEPORT, CONNECTICUT, ASSIGNOR TO GENERAL ELECTRIC COMPANY, A CORPORATION OF NEW YORK

WIRING DEVICE

Application filed May 28, 1931. Serial No. 540,671.

My invention relates to wiring devices and more specifically to wiring devices adapted to be located in openings in the walls, ceiling or floor of a room.

There has been considerable difficulty with former devices of this character in the connecting of the wiring devices and the securing of the devices in the openings provided therefor. In general, these difficulties have been due to the fact that the devices were so designed that the connection of the wiring device had to be made in the smallest space possible so that the cable would not occupy too much room when the wiring device was placed in its position in the outlet box. The securing of the outlet box in the opening has also presented difficulties especially in the wiring of houses after they had been constructed. The primary cause of the difficulties experienced in the use of the former devices has been in the necessity of locating the outlet box in position in the opening and clamping the cable before making the connection to a wiring device such as a convenience outlet, fuse block, switch or the like.

It is an object of my invention to provide a wiring device which is easy to connect and install and which is provided with a minimum number of parts and occupies a very small space. It is also an object of my invention to provide a wiring device by means of which a cable may be connected to the wiring device before it is clamped and the outlet box secured in position in an opening.

In accordance with my invention, a wiring device is provided by means of which a convenience outlet, switch, or the like may be connected to the cable before the cable is clamped in an outlet box which is then secured in an opening in the wall. The improved wiring device of my invention is easy to assemble and the parts held in position without any unnecessary parts or securing devices.

My invention will be better understood from the following description with reference to the accompanying drawing and the scope of the invention will be pointed out in the appended claims. Fig. 1 is a cross sectional view of the wiring device of my invention secured in an opening in a baseboard; Fig. 2 is a view of the wiring device along the line 2—2 of Fig. 1, looking in the direction indicated by the arrows; Fig. 3 is a cross sectional view of the terminal securing device; Fig. 4 is an exploded view, in perspective, from the rear of the wiring device.

Referring to the drawing, 10 indicates a baseboard with an opening 11 provided for the reception of a wiring device or outlet. 12 represents an armored cable located behind the baseboard and connected to outlet 13 which has been secured in position in opening 11. Outlet 13 comprises an outlet box or housing 14 with a wiring device or convenience outlet 15 located therein. A cable clamp 16 is provided to hold the cable in position with respect to the outlet box. A face plate 17 is provided to cover the opening of outlet box 14 and at the same time hold the cable, clamp and convenience outlet in position in said box. To secure the outlet 13 in the opening 11 of the baseboard 10, wood screws 18 are provided. Obviously if it were desired to secure the outlet box 13 in an opening in a wall or ceiling, expanding bolts, clamps, or other suitable securing devices could be substituted for wood screws 18. An attachment plug or cap 19 is shown in dotted lines in position to be connected with convenience outlet 15. Attachment cap 19 would serve to connect any electrical circuit or device to the convenience outlet. Contact clips 20 and 21 are provided to engage the projecting blades of attachment cap 19 to complete the electrical connection between the cable 12 and the circuit to which the attachment cap is connected. Referring to Fig. 2, it may be seen that the contact clips 20 and 21 are connected to the conductors of the cable 12 by means of binding posts 22 and 23 respectively. The binding posts 22 and 23 comprise screws which are adapted to be inserted in metal inserts 24. The body of convenience outlet 15 is molded with inserts 24 in position in the mold. The contact clips 20 and 21 are placed over projecting ends of inserts 24 which are then expanded providing shoulders to engage the clips and hold them in position in firm contact with the inserts. As indicated in Fig. 4, outlet box or housing 14 is provided with an opening 25 through which cable 12 may pass. Opening 25 is of general circular configuration except for two arcuate sections 36 and 37 located at opposite sides of the central opening. Cable clamp 16 is a two-part clamp and provided with shoulders 26 to engage the base of outlet box 14. The two parts of clamp 16 are provided with throats 38 adjacent the shoulders 26 which are of substantially the same width as the arcuate sections 36 and 37 of opening 25. Thus when the clamp 16 is expanded into position in the base of housing 14 relative longitudinal and transverse movement between the housing and clamp are prevented. To tighten clamp 16 around cable 12, screws 27 are provided which are inserted in apertures 28 in one part of the clamp and screwed into the threaded apertures 29 in the other part of the clamp. Convenience outlet 15 is an insulating member provided with rearward extensions 30 to provide seats for the two parts of cable clamp 16. These projections 30 prevent the convenience outlet from twisting with respect to the cable, thus breaking one of the conductors or pulling it away from its binding post. Forward projections 31 (Fig. 1) are provided on the convenience outlet to cooperate with recesses 32 in face plate 17 to provide polarity means and to keep openings 33 in the face plate in alignment with the corresponding openings in convenience outlet 15 in which the clips 20 and 21 are located. The polarizing of the convenience outlet is obtained by making the upper projection 31 smaller than the lower one and making the upper recess 32 correspondingly smaller than the lower recess. The openings 33 are likewise polarized to cooperate with a polarized plug. A recess 34 is provided in convenience outlet 15 with shoulders to provide a stop for the cable armor. Recess 34 communicates with opening 35 which provides a passage for the cable conductors.

To connect outlet 13 to cable 12 at any desired point in a wall, ceiling, or floor, an opening is first cut at the desired point slightly larger than the outlet box 14. Cable 12 is pulled out through opening 11 in wall 10. Clamp 16 is inserted through opening 25 in outlet box 14 and then expanded into position so the shoulders 26 engage the base of the outlet box. Cable is next threaded through outlet box 14 and clamp 16. A portion of the armor is removed to expose the conductors and insulation stripped from the ends of the conductors. The conductors are pulled through the opening 35 in convenience outlet 15 until the armor contacts with the end of recess 34. The conductors are connected to the convenience outlet by means of binding posts 22 and 23. Cable 12 is pushed back through opening 25 in the base of outlet box 14 until the projections 30 on the convenience outlet 15 contact with the base of the outlet box. The cable clamp 16 is then secured to the cable by means of screws 27. The outlet box is then placed in position in the opening, the face plate being placed over the opening of the box with projections 31 seated in corresponding recesses 32. The outlet box and face plate are secured in position by means of wood screws 18. As may be seen in Fig. 1 the cable clamp and convenience outlet are held in position in the box by means of face plate 17. Relative transverse motion between the cable, convenience outlet and face plate is prevented by the projections 30 and 31 from the convenience outlet 15 which engage the cable clamp and the face plate.

In accordance with my invention, a wiring device is provided which may readily be connected to a cable while the cable is pulled out a substantial distance through the opening in which the outlet is to be secured. The device has the further advantage that the cable does not have to be clamped and secured to the outlet box before connection is made to the wiring device. The securing of the outlet box in the opening is a very simple matter because of the fact that it may be done from the front of the box and no connection need be made in the rear of the wall, ceiling or floor. Another important feature of my invention is that all unnecessary space in the outlet box is eliminated and so there is a great reduction in the amount of material in the box and the size of opening necessary to accommodate it. For purposes of illustration, I have indicated a convenience outlet connected in the outlet box but it is obvious that a switch, fuse block, or other wiring device, might be readily located therein.

What I claim as new and desire to secure by Letters Patent of the United States, is:

1. In a wiring system, an outlet box adapted to receive a wiring device and having an opening through which a cable may pass, a cable clamp having shoulders to engage the base of said outlet box, a wiring device to which a cable may be connected provided with a stop for the cable armor, and a face plate cooperating with said outlet box to hold the wiring device in position in said box when the outlet box is secured in an opening in a wall.

2. In a wiring system, an outlet box adapted to receive a wiring device and having an opening through which a cable may pass, a cable clamp having shoulders to engage the base of said outlet box, a wiring device to which a cable may be connected provided with a stop for the cable armor and having forward projections, and a face plate having recesses to engage said forward projections of the wiring device and cooperating with said outlet box to hold the wiring device in position in said box when the outlet box is secured in an opening in a wall.

3. An electrical outlet comprising a housing having an opening through which a cable may pass, a two-part cable clamp having shoulders to engage the base of said housing, a convenience outlet to which a cable may be connected provided with a seat for the cable armor and having rearward projections to provide seats between the two parts of said clamp and forward projections cooperating with said housing to hold the convenience outlet in position in said housing when the housing is secured in an opening in a wall.

4. In a wiring system an outlet box adapted to receive a wiring device and having an opening through which a cable may pass, a cable clamp having shoulders to engage the base of said outlet box and throats to seat in arcuate sections of said opening to prevent longitudinal or transverse movement of the clamp in said outlet box, a wiring device to which a cable may be connected provided with rearward projections to engage said clamp and forward projections, and a face plate having recesses to engage said forward projections of the wiring device whereby relative transverse movement between the cable clamp wiring device and face plate is prevented.

In witness whereof I have hereunto set my hand.

GEORGE CARLSON.